United States Patent [19]
Martin

[11] Patent Number: 5,371,589
[45] Date of Patent: Dec. 6, 1994

[54] TRIAXIAL RING LASER GYROSCOPE WITH INDEPENDENT CAVITY LENGTH CONTROL

[75] Inventor: Graham J. Martin, Canoga Park, Calif.

[73] Assignee: Litton Systems, Inc., Beverly Hills, Calif.

[21] Appl. No.: 358,947

[22] Filed: May 30, 1989

[51] Int. Cl.$^5$ .............................................. G01B 9/02
[52] U.S. Cl. ...................................... 356/350; 372/94
[58] Field of Search ........................... 356/350; 372/94

[56] References Cited

U.S. PATENT DOCUMENTS

| | | | |
|---|---|---|---|
| 3,484,169 | 12/1969 | Skalski et al. | 356/350 |
| 3,503,688 | 3/1970 | Lechevalier | 356/350 |
| 3,581,227 | 5/1971 | Podgorski | 356/350 |
| 4,407,583 | 10/1983 | Simms | 356/350 |
| 4,795,258 | 1/1989 | Martin | 356/350 |

Primary Examiner—Stephen C. Buczinski
Attorney, Agent, or Firm—Elliott N. Kramsky

[57] ABSTRACT

A monolithic triaxial ring laser gyroscope includes three orthogonal ring cavities, the optical path length of each of which is independently controllable. Three planar ring cavities are formed within a frame that is shaped into the form of a rhombic dodecahedron. A mirror is fixed to each of the twelve faces of the frame for directing the counter propagating light beams within the three orthogonal cavities. Anodes which communicate with the cavities through bore holes are fixed to predetermined surfaces of the frame while three cathodes are positioned at flattened portions of preselected vertices of the dodecahedron and located in such a way as to eliminate undesired bias resulting from Fresnel-Frizeau effects.

8 Claims, 4 Drawing Sheets

TRIAXIAL RING LASER GYROSCOPE WITH INDEPENDENT CAVITY LENGTH CONTROL

BACKGROUND

1. Field of the Invention

The present invention relates to instrumentation for the measurement of rotation. More particularly, this invention pertains to a strapdown gyroscope for measuring rotation about three orthogonal axes.

2. Background of the Prior Art

Prior art designs for integrating three ring laser gyroscopes (for measuring rotations about an orthogonal set of axes) into a block of glass ceramic material or the like have focussed upon minimizing the number of mirrors. For example, U.S. patent Ser. Nos. 4,477,188 of Stiles et al. for "Monolithic Three-Axis Ring Laser Gyroscope", 4,407,583 of Simms entitled "Ring Laser Gyroscope" and 4,616,929 of Bernelin et al. for "Compact, Integral, 6-Mirror Triaxial, Laser Rate Gyro" disclose cubic frames with six (6) mirrors for creating three orthogonal interior ring cavities.

The design of a triaxial gyro of the above-described type necessarily occasions the sharing of cavity mirrors among the three rotation-sensing closed ring cavities. As a consequence, optimum operation of the instrument is complicated by the significant additional complexity required to control cavity length. Economies effected through the use of a minimal number of mirrors are to some measure sacrificed by the additional complexity required for a cavity length control system that must take into account the interdependencies between the signals generated in the three cavities. The oscillation of a mirror that is shared by a pair of cavities necessarily effects the path lengths of both of such cavities.

Furthermore, optical coupling between the cavities can occur as a result of light scattering in shared-mirror arrangements. Thus, while the prior art cubic frames with shared mirrors afford some economies, in operation those devices are significantly compromised as a result of cavity length control difficulties and undesired optical coupling effects.

SUMMARY OF THE INVENTION

The present invention overcomes the aforesaid shortcomings of the prior art and others by providing an improvement in a monolithic ring laser gyroscope for measuring rotation about three orthogonal axes of the kind that includes a block having three lasing cavities, each arranged within the block for sensing rotation about one of the such axes. In the invention, each of the cavities compromises four straight segments, the ends of the four segments intersecting to form three independently-controllable ring cavities.

The preceding and other features and advantages of the present invention will become further apparent from the detailed description that follows. This description is accompanied by a set of drawing figures. Numerals of the figures, corresponding to those of the written description, point to the features of the invention, like numerals referring to like features throughout.

DETAILED DESCRIPTION

Figure 1:
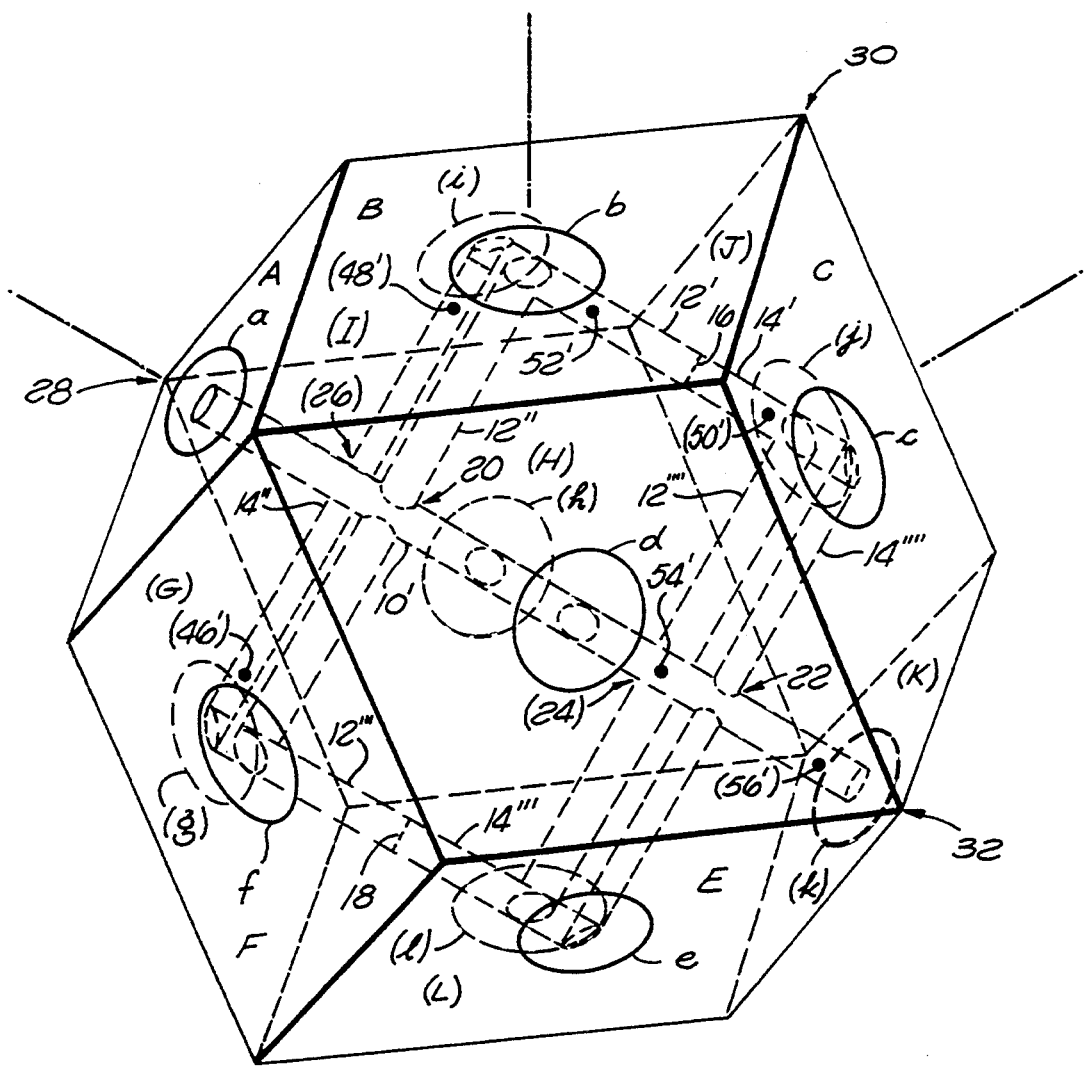
FIG. 1 is a perspective view of a portion of the present invention for illustrating the rhombic dodecahedral-shaped frame, the mirrors mounted thereon, and the three independent internal ring cavities for sensing rotations about orthogonal axes.

Turning now to the drawings, FIG. 1 is a perspective view of a portion of a triaxial ring laser gyroscope in accordance with the invention. That is, FIG. 1 illustrates the block or frame of the triaxial gyroscope and the arrangement of three ring cavities therein. Materials having a low coefficient of thermal expansion appropriate for formation of the frame include Pyrex glass and the glass ceramic materials manufactured and sold under the trademarks of "Cer-Vit" and "Zerodor".

For purposes of clarity, the gyroscope electrodes, apparatus relating to optical path length control and their relationships to the gyroscope cavities, are disclosed with greater detail in the following figures.

Returning to FIG. 1, the frame is seen to comprise a block of appropriate material that has been machined substantially into the shape of a rhombic dodecahedron, a regular, twelve (12) sided solid geometrical shape. The various faces comprising the frame are indicated by capital letters. According to a convention that is followed throughout this application, numbered or lettered elements that are directed into the plane of the page are enclosed in parentheses. Thus, of the twelve (12) faces A through L, one can see from the notations of FIG. 1 that faces A through F are oriented toward the reader and away from the page while faces G through L are at the side of the frame that faces into the plane of the page.

Three (3) planar ring cavities 10, 12 and 14 are formed within the frame. Each of such cavities is arranged to detect rotation about one of three (3) orthogonal axes. Each comprises four (4) straight equal cavity segments of equal lengths, each cavity segment being denoted by the number of such cavity combined with a prime superscript. Thus, for example the cavity 12 comprises the four cavity segments (moving in a counter clockwise direction around the cavity) 12', 12", 12''' and 12''''.

A mirror is positioned at each of the four (4) corners of each ring cavity for redirecting and deflecting counter-propagating beams of light therein. Each cavity mirror is located adjacent to an intersection of segments and thus a total of twelve (12) mirrors, one of such mirrors being located upon each of the faces of the rhombic dodecahedron-shaped frame are employed. The mirrors of the gyroscope are indicated by small letters, "a" through "l", the lower case letter corresponding to the face of the frame upon which it is fixed. Thus, for example mirror a is fixed to face A while mirror k which (indicated in parentheses as it faces into the plane of the paper) is fixed to face K.

Figure 4:
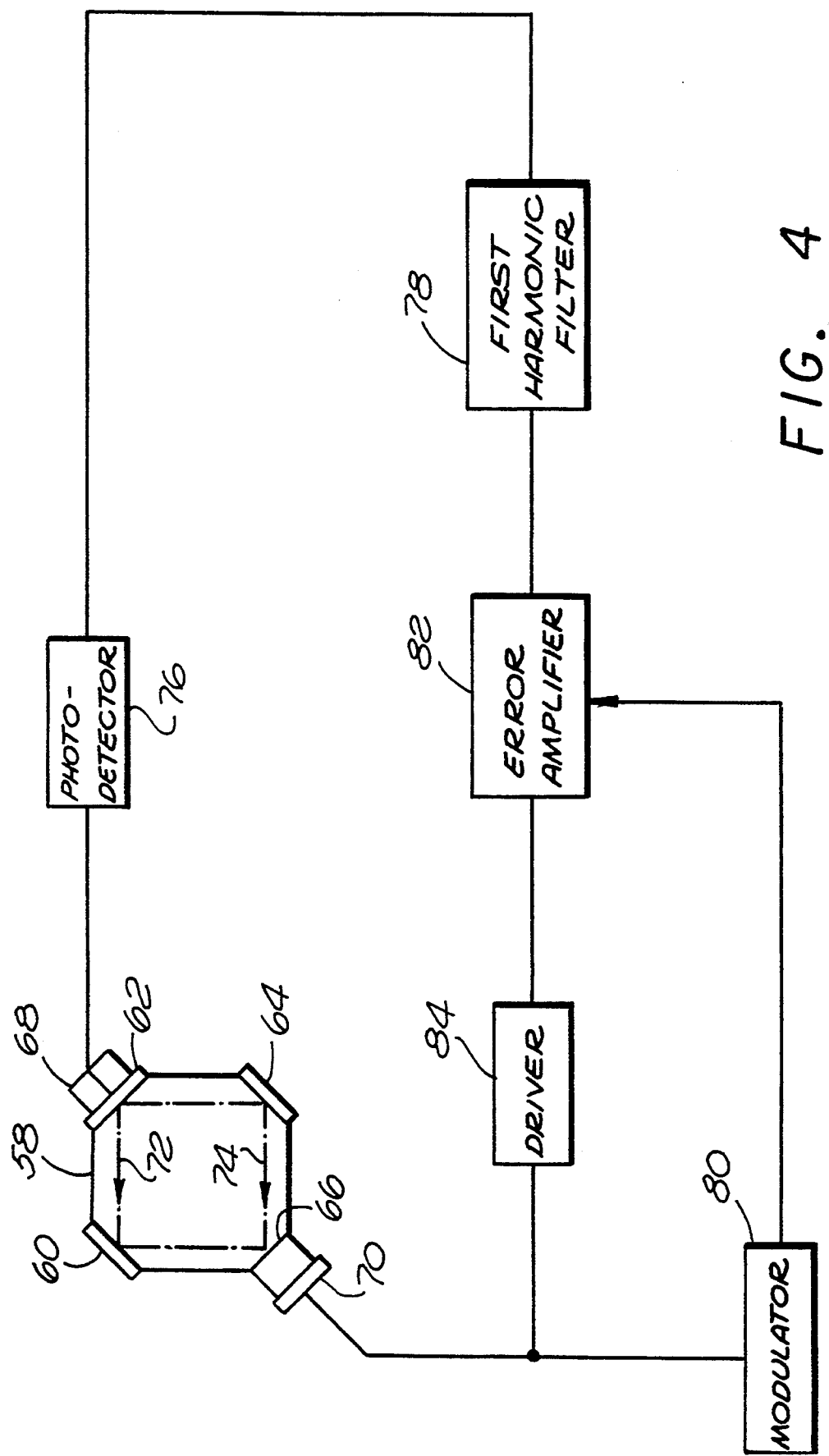
FIG. 4 is a block diagram of a circuit for controlling the optical path length of a ring cavity of the invention, it being understood that similar arrangements, independent thereof, are provided for controlling the optical path lengths of the other cavities.

As will become further apparent, particularly with reference to FIG. 4, one mirror associated with each of the cavities 10, 12 and 14 is partially transmissive and includes output optics associated therewith. Furthermore, another mirror of each of said cavities is fixed to a pzt transducer for adjusting the length of the optical path within that cavity. By selecting a dodecahedron-shaped frame, one is able to achieve the necessary orientations of mirrors for providing three independent ring cavities within a single block. This is quite unlike prior art triaxial designs that employ cubic frames.

As can be seen, each of the three ring cavities intersects the remaining two cavities in two separate locations. Thus, cavities 12 and 14 intersect at 16 and 18, the cavities 10 and 12 intersect at 20 and 24 and the cavities 10 and 14 intersect at 22 and 26. As will be seen in FIG. 2, the points of intersection between the cavities are utilized for communication with the three cathodes of the gyroscope through frame bore holes (not shown in FIG. 1).

Figure 2:
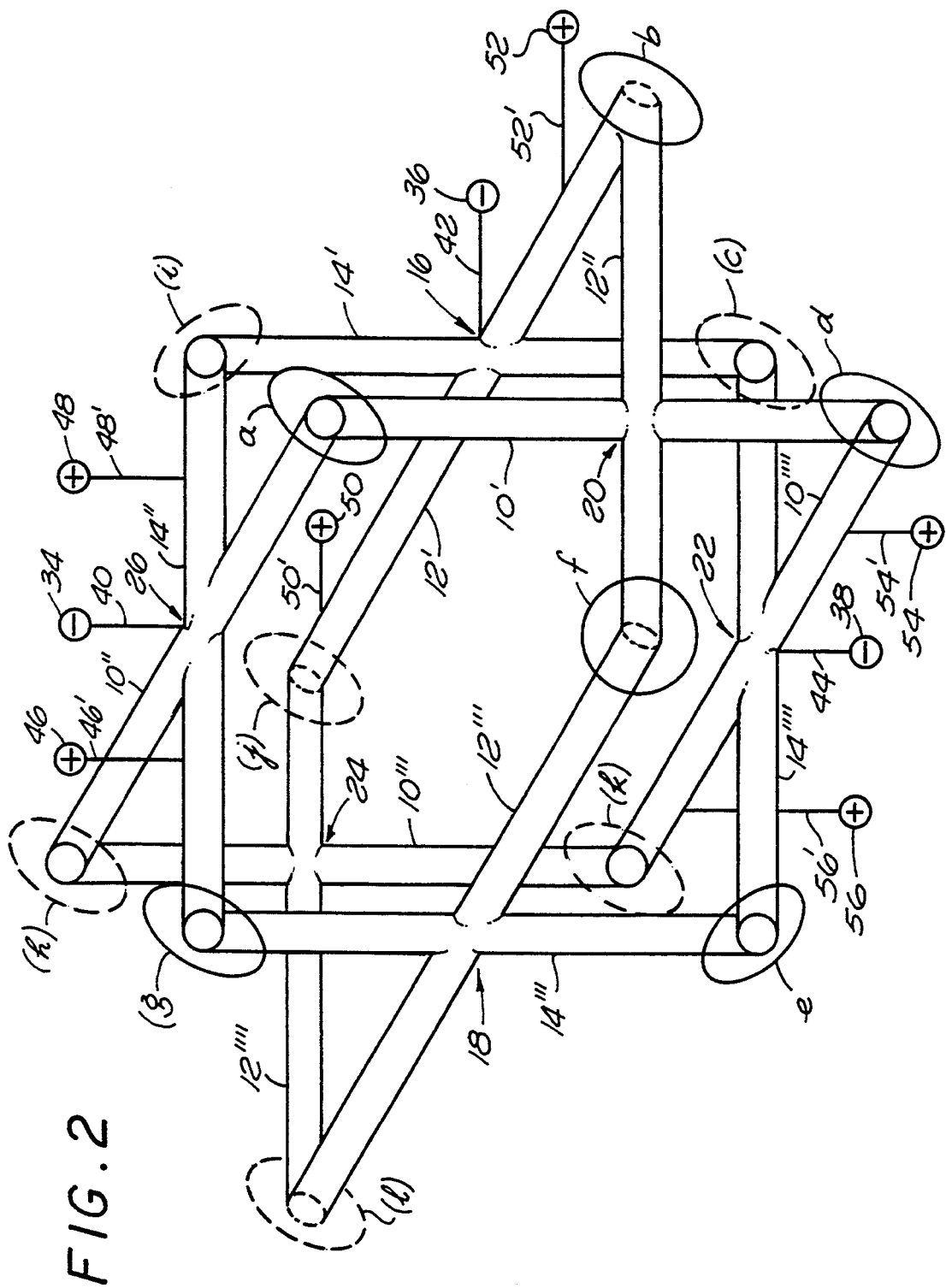
FIG. 2 is a perspective view of the arrangement of the cavities and electrodes of the invention.

The dodecahedron-shaped frame includes sixteen (16) vertices. Three of these, vertices 28, 30 and 32, are flattened during manufacture to provide pads for fixation of the three gyroscope cathodes 34, 36 and 38 respectively. Such cathodes are indicated symbolically in FIG. 2, a perspective view of the arrangement of the cavities and electrodes of invention. Referring further to FIG. 2, the cathodes 34, 36 and 38 are seen to communicate with the internal cavities of the device by means of the bore holes indicated symbolically at 40, 42 and 44 respectively. As can be seen, such bore holes communicate with the internal cavities at the intersections 26 (intersection of cavities 10 and 14), 16 (intersection of cavities 12 and 14) and 22 (intersection of cavities 10 and 14) respectively. Alternatively a single cathode may be created internally in the block by hollowing out the center.

Pairs of anodes are associated with each cavity and are located in such a way as to eliminate the undesired bias that may arise as a result of Fresnel-Frizeau effects occasioned by Langmuir flow of the gain medium. Referring again to FIG. 2, wherein the anodes of the gyroscope are symbolically indicated, anodes 46 and 48 (connected by means of the bore holes indicated by corresponding primed numerals) communicate with segment 14″ of the ring cavity 14 while anodes 50 and 52 communicate with segment 12′ of ring cavity 12 and anodes 54 and 56 communicate with segment 10‴ of the ring cavity 10. The precise locations of the anodes with respect to the faces of the frame may be ascertained from FIG. 1. In FIG. 1, primed numerals, corresponding to the designations of the bore holes that connect the anodes to the ring cavities, are indicated. As before, the bore holes that are directed away from the reader and into the plane of the paper are enclosed in parentheses while those directed out of the plane of the paper are not. By observing this convention, it may be readily ascertained that the following correspondence exists between the anodes and the faces of the dodecahedron-shaped frame:

| Anode | Face of frame |
|-------|---------------|
| 46    | G             |
| 48    | I             |
| 50    | J             |
| 52    | B             |
| 54    | D             |
| 56    | K             |

As can be seen, the unique dodecahedron-shaped frame permits anode placement for balanced current flows without requiring the placement of more than one anode upon a single face.

Figure 3:
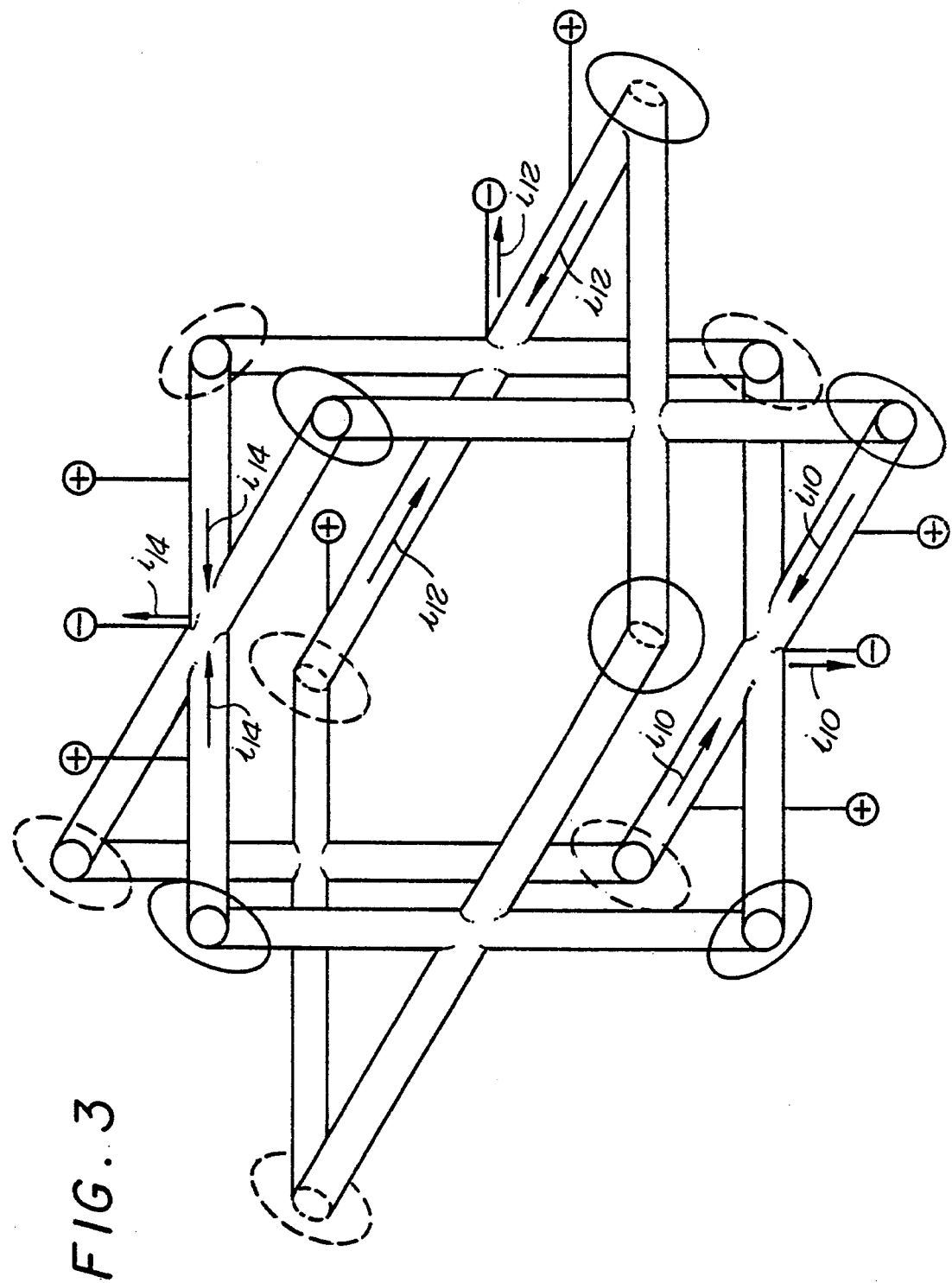
FIG. 3 is a perspective view of the arrangement of cavities and electrodes for the purpose of illustrating the flows of currents for exciting the gain regions with the three cavities.

FIG. 3 is a perspective view of the ring cavities of the gyroscope showing the current flows that result from the placements of the electrodes as indicated. As can be seen, the current flows for exciting the gain media within each of the cavities are symmetrical and, insofar as their effects upon the counterpropagating beams allow cancellation of phase shifts from Fresnel-Frizeau drag which may arise from Langmuir and other gas flow effects.

FIG. 4 is a block schematic diagram of circuitry for controlling cavity length in a typical ring cavity of the gyroscope. As mentioned earlier, the arrangement of the invention permits one to utilize a simplified method of cavity length control (based on maximizing signal intensity).

A planar section of the three dimensional frame is indicated at 58. The section 58 discloses a planar ring cavity that includes four corner mirrors 62, 64 and 66. The dodecahedron-shaped frame is such that the light incident angle for the mirrors of each of the three intersecting cavities is 35.26 degrees.

As indicated, the mirror 62 is partially transmissive and includes an optical combining prism 68. A pzt transducer 70 controls the position of the mirror 66, thereby controlling the overall optical path length of the cavity about which the beams 72 and 74 counter propagate as indicated.

An optical signal that provides a measure of the intensity of the counterpropagating beams 72 and 74 72 and 74 is directed by the prism 68 to a photodetector 76 that provides an electrical signal in response thereto. Mirror 66 is oscillated at preselected frequency $\omega_o$ by means of a modulator 80. The photodetector signal is routed to a filter 78 that passes the electrical a.c. component at $\omega_o$, the modulating frequency. As is well known, peak gain is attained within the ring cavity when the component at the modulating frequency is eliminated. The fundamental content thereby provides a measure of error that is applied to an error detector 82 which converts it to a d.c. signal that energizes a driver for providing a d.c. signal to the transducer 70 for adjusting the position of the mirror 66 and, accordingly, the optical path length of the ring cavity.

As mentioned earlier, identical cavity length control arrangements to that shown in FIG. 4 may be utilized for each of the three orthogonal cavities. As can be seen, the method of cavity length control employed is relatively straightforward and void of reference to the conditions, including, of course, the optical path lengths of the other cavities. Accordingly, the electronics required for maximizing signal intensity in each of the three cavities is simplified and straightforward. In addition, as mentioned earlier, the undesirable optical crosstalk of prior art designs (which may occur at mirror surface points common to two light paths) is avoided by providing a triaxial ring laser gyroscope with truly independent orthogonal ring cavities. By utilizing a rhombic dodecahedron-shaped frame, it is seen that one may realize the highly-desirable benefits of independent cavity operation within an integrated instrument block.

While this invention has been illustrated with respect to its presently preferred embodiment, it is not limited thereto. Rather, this invention is only limited insofar as defined by the following set of claims and includes within its scope all equivalents thereof.

What is claimed is:

1. A monolithic ring laser gyroscope for measuring rotations about three orthogonal axes including a block having three lasing cavities, each of said cavities being arranged within said block for sensing rotation about one of said axes, said gyroscope additionally comprising:
   a) each of said cavities comprising four straight segments;
   b) the ends of said four segments comprising each cavity intersecting to form three independently-controllable ring cavities;
   c) said block being in the shape of a rhombic dodecahedron; and
   d) twelve mirrors, each of said mirrors being positioned upon a face of said block and located adjacent the intersection of a pair of cavity segments for reflectively directing a beam of laser light about each of said ring cavities.

2. A monolithic ring laser gyroscope as defined in claim 1 further comprising:
   a) means associated with each of said cavities for controlling the length thereof; and
   b) each of said means is responsive to a signal that is independent of the lengths of the other cavities.

3. A monolithic ring laser gyroscope as defined in claim 2 wherein two segments of each of said cavities intersect two segments of each of said other cavities.

4. A monolithic ring laser gyroscope as defined in claim 3 wherein each of said intersections occurs at the middle of a cavity segment.

5. A monolithic ring laser gyroscope as defined in claim 4 further characterized in that:
   a) three of the vertices of said rhombic dodecahedron-shaped block are flattened to form pads; and
   b) a cathode is fixed to each of said pads.

6. A monolithic ring laser gyroscope as defined in claim 5 wherein a bore hole connects the interior of each of said cathodes with the intersection between a pair of cavities.

7. A monolithic ring laser gyroscope as defined in claim 6 wherein each of said bore holes communicates with the intersection between a distinct pair of cavities.

8. A monolithic ring laser gyroscope as defined in claim 7 further including:
   a) a pair of anodes associated with each cavity;
   b) the interior of each of said anodes communicates with one segment of said cavity through a pair of bore holes; and
   c) said bore holes intersect said segment at opposite sides of the intersection between said segment and the bore hole connecting said segment with the interior of a cathode.

* * * * *